(12) United States Patent
Oyadomari et al.

(10) Patent No.: US 7,764,695 B2
(45) Date of Patent: Jul. 27, 2010

(54) ARM AND ROLLBACK IN A MULTI-CHASSIS SYSTEM

(76) Inventors: Randy I. Oyadomari, 3026 Rose Creek Dr., San Jose, CA (US) 95148; George A. Bullis, 147 Branch Oak Ct., Glendora, CA (US) 91741; Minh Q. Vu, 3300 Kloetzel La., San Jose, CA (US) 95148

( * ) Notice: Subject to any disclaimer, the term of this patent is extended or adjusted under 35 U.S.C. 154(b) by 574 days.

(21) Appl. No.: 11/534,916

(22) Filed: Sep. 25, 2006

(65) Prior Publication Data
US 2008/0126874 A1 May 29, 2008

(51) Int. Cl.
*H04Q 11/00* (2006.01)
*H04L 12/56* (2006.01)

(52) U.S. Cl. .................. 370/400; 370/218; 370/252; 370/386; 370/466; 709/220; 709/238; 709/250; 714/11; 714/27; 714/46; 714/57

(58) Field of Classification Search ...... 370/216–236.2; 709/220–235
See application file for complete search history.

(56) References Cited

U.S. PATENT DOCUMENTS

| | | | |
|---|---|---|---|
| 5,027,297 A | 6/1991 | Garitty | 364/569 |
| 5,590,116 A | 12/1996 | Zhang | 370/13 |
| 5,666,359 A * | 9/1997 | Bennett et al. | 370/358 |
| 5,696,701 A | 12/1997 | Burgess | 364/999.999 |
| 5,761,424 A | 6/1998 | Adams | 395/200.47 |
| 5,812,529 A | 9/1998 | Czarnik | 370/245 |
| 5,850,386 A | 12/1998 | Anderson | 370/241 |
| 5,912,701 A | 6/1999 | Morton | 348/192 |
| 6,049,545 A | 4/2000 | Stephenson | 370/410 |
| 6,058,116 A | 5/2000 | Hiscock | 370/401 |

(Continued)

FOREIGN PATENT DOCUMENTS

EP 726664 A2 8/1996

(Continued)

OTHER PUBLICATIONS

Peter Burden, *Routing in the Internet*, Webopedia, *available at* http://www.scit.wlv.ac.uk/~jphb/comms/iproute.html, last visited Mar. 2, 2005.

(Continued)

*Primary Examiner*—Ayaz R Sheikh
*Assistant Examiner*—Mounir Moutaouakil
(74) *Attorney, Agent, or Firm*—Workman Nydegger (57) ABSTRACT

A multi-chassis system includes at least a first chassis and a second chassis that each includes one or more blades. The one or more blades in turn include one or more ports. The two or more chassis are connected through use of an interconnector. The multi-chassis system may also include access to one or more microprocessors that may execute thereon software that controls the propagation of the arm condition. The arm condition is generated at a first port of a first chassis or network analyzer blade coupled to the first chassis. The arm condition is then transmitted to one or more additional ports of the first chassis while not being transmitted to any ports of the second chassis. Finally, the reception of a precondition for triggering defined by the arm condition is limited to those ports that have received the arm condition.

17 Claims, 4 Drawing Sheets

U.S. PATENT DOCUMENTS

| | | | |
|---|---|---|---|
| 6,098,157 A | 8/2000 | Hsu | 711/157 |
| 6,243,834 B1 | 6/2001 | Garrett | 714/37 |
| 6,266,789 B1 | 7/2001 | Bucher | 714/39 |
| 6,335,931 B1 | 1/2002 | Strong | 370/390 |
| 6,507,923 B1 | 1/2003 | Wall | 714/712 |
| 6,636,518 B1 | 10/2003 | Liencres | 370/395.7 |
| 6,639,957 B2 | 10/2003 | Cahill O'Brien | 375/354 |
| 6,654,356 B1 | 11/2003 | Eidson | 370/503 |
| 6,665,725 B1 | 12/2003 | Dietz | 709/230 |
| 6,789,182 B1 | 9/2004 | Brothers | 712/28 |
| 6,793,539 B1 | 9/2004 | Lee | 439/701 |
| 7,120,725 B2* | 10/2006 | Sandy et al. | 710/314 |
| 7,174,413 B2* | 2/2007 | Pettey et al. | 710/317 |
| 7,188,209 B2* | 3/2007 | Pettey et al. | 710/317 |
| 7,209,358 B2* | 4/2007 | Garnett et al. | 361/735 |
| 7,219,183 B2* | 5/2007 | Pettey et al. | 710/316 |
| 7,325,058 B1* | 1/2008 | Sheth et al. | 709/225 |
| 2002/0009079 A1* | 1/2002 | Jungck et al. | 370/389 |
| 2004/0260842 A1* | 12/2004 | Pettey et al. | 710/1 |
| 2004/0268015 A1* | 12/2004 | Pettey et al. | 710/313 |
| 2005/0010691 A1 | 1/2005 | Oyadomari | 709/223 |
| 2005/0025119 A1* | 2/2005 | Pettey et al. | 370/351 |
| 2005/0060402 A1 | 3/2005 | Oyadomari | 709/224 |
| 2005/0060413 A1 | 3/2005 | Oyadomari | 709/253 |
| 2005/0102437 A1* | 5/2005 | Pettey et al. | 710/1 |
| 2005/0147117 A1* | 7/2005 | Pettey et al. | 370/463 |
| 2006/0029104 A1* | 2/2006 | Jungck | 370/498 |
| 2006/0067506 A1* | 3/2006 | Flockhart et al. | 379/265.09 |
| 2006/0184711 A1* | 8/2006 | Pettey et al. | 710/316 |
| 2008/0028107 A1* | 1/2008 | Cherian et al. | 710/9 |

FOREIGN PATENT DOCUMENTS

| | | |
|---|---|---|
| WO | WO 01/52400 A1 | 7/2001 |

OTHER PUBLICATIONS

Keith Schultz, *A Complete Solution, Enterasys Networks proves its mettle in enterprise-class switching*, Internetweek.Com, Jan. 22, 2001, available at http://www.internetweek.com/reviews01/rev012201.htm.

Web page: Marvell Press Release, *Galileo Announces New High-Performance 240-port Ethernet Switch Reference Design*, Sep. 13, 1999.

* cited by examiner

ARM AND ROLLBACK IN A MULTI-CHASSIS SYSTEM

CROSS-REFERENCE TO RELATED APPLICATIONS

Not applicable.

BACKGROUND

Computer and data communications networks continue to develop and expand due to declining costs, improved performance of computer and networking equipment, and increasing demand for communication bandwidth. Communications networks, including for example, wide area networks ("WANs"), local area networks ("LANs"), and storage area networks ("SANs") allow increased productivity and utilization of distributed computers or stations through the sharing of resources, the transfer of voice and data, and the processing of voice, data, and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Gigabit Ethernet, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types has different sets of standards, referred to as protocols, which set forth the rules for accessing the network and for communicating among the resources on the network.

Typically, transmissions between two network connected devices are passed through a hierarchy of protocol layers at each of the connected devices. Each layer in the first network connected device essentially carries on a conversation with a corresponding layer in the second network connected device, in accordance with an established protocol that defines the rules of communication between the layers.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Example causes of network performance problems include the transmission of unnecessarily small frames of information, inefficient or incorrect routing of information, improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

One device that is used to detect these errors is a protocol analyzer, also called a network analyzer. A protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks. A protocol analyzer operates by capturing selected portions of data from a data stream that is transmitted via the communications network. The captured information may then be analyzed in greater detail by the protocol analyzer to extract desired information. For instance, data transmission faults or errors, or performance errors, known generally as problem conditions, may be diagnosed by examining the captured data that is related to the problem. Hacking can also be detected through a protocol analyzer.

Protocol analyzers can be transparent to a network(s) or be configured as gateways or switching networks. Regardless, they include ports (physical connections) to the networks. The ports provide connectivity to the networks and permit the protocol analyzers to receive and capture network data. The ports are often provided on a blade (or card) that is often contained in a chassis (or box) with a common backplane or bus. The chassis may be modular, thereby allowing multiple chassis to be mounted to a rack in a customizable and expandable system. Such multi-chassis protocol analyzer systems provide access to a large number of ports over numerous blades that can be used for various purposes.

As networks have become more complex and sophisticated, protocol analyzers with increasing numbers of ports have been developed, enabling the protocol analyzers to be configured for use with different data links or channels. The increasing numbers of ports, however, increases the complexity of protocol analyzers and presents the problem of coordinating among ports to capture network data in a way that enables the time sequence of the data transmitted in multiple channels or data links to be accurately represented.

BRIEF SUMMARY

Embodiments disclosed herein relate to methods, systems, and computer program products for controlling the propagation of an arm condition across multiple ports of a multi-chassis system. The multi-chassis system includes a first chassis and a second chassis that each includes one or more blades. The one or more blades in turn include one or more ports. The two or more chassis are connected through use of an interconnector. The one or more blades may also have a connector that allows them to be connected to a chassis. The multi-chassis system may also include access to one or more microprocessors that may execute thereon software that controls the propagation of the arm condition.

In one embodiment, an arm condition is generated at a first port of a first chassis or network analyzer blade coupled to the first chassis. The arm condition is then transmitted to one or more additional ports of the first chassis while not being transmitted to any ports of the second chassis. Finally, the reception of a precondition for triggering defined by the arm condition is limited to those ports that have received the arm condition.

In another embodiment, a rollback condition that de-arms the arm condition is generated at a port of the multi-chassis system. The rollback condition is then transmitted to those ports that have received the arm condition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to methods, systems, and computer program products for controlling the propagation of an arm condition across multiple ports of a multi-chassis system. The multi-chassis system includes a first chassis and a second chassis that each includes one or more blades. The one or more blades in turn include one or more ports. The two or more chassis are connected through use of an interconnector. The one or more blades may also have a connector that allows them to be connected to a chassis. The multi-chassis system may also include access to one or more microprocessors that may execute thereon software that controls the propagation of the arm condition.

In one embodiment, an arm condition is generated at a first port of a first chassis or network analyzer blade coupled to the first chassis. The arm condition is then transmitted to one or more additional ports of the first chassis while not being transmitted to any ports of the second chassis. Finally, the reception of a precondition for triggering defined by the arm condition is limited to those ports that have received the arm condition.

In another embodiment, a rollback condition that de-arms the arm condition is generated at a port of the multi-chassis system. The rollback condition is then transmitted to those ports that have received the arm condition.

As a practical matter, the embodiments disclosed herein are often tied to a particular hardware implementation. The particular hardware configuration discussed herein, however, is for illustrative purposes and the embodiments disclosed herein are not necessarily limited to any specific hardware configuration. Various embodiments of may comprise a special purpose or general-purpose computer including various computer hardware, as discussed in greater detail below.

As used herein, the terms "protocol analyzer" and "network analyzer" are used interchangeably and relate to devices having hardware and/or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM, DVD or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of the embodiments of the invention. It is to be understood that the drawings are diagrammatic and schematic representations of such embodiments, and are not limiting of the present invention, nor are they necessarily drawn to scale.

In the following description, numerous specific details are set forth in order to provide a thorough understanding of the present invention. It will be obvious, however, to one skilled in the art after having read this description that the present invention may be practiced without these specific details. In other instances, well-known aspects of network systems have not been described in particular detail in order to avoid unnecessarily obscuring the present invention.

Figure 1:
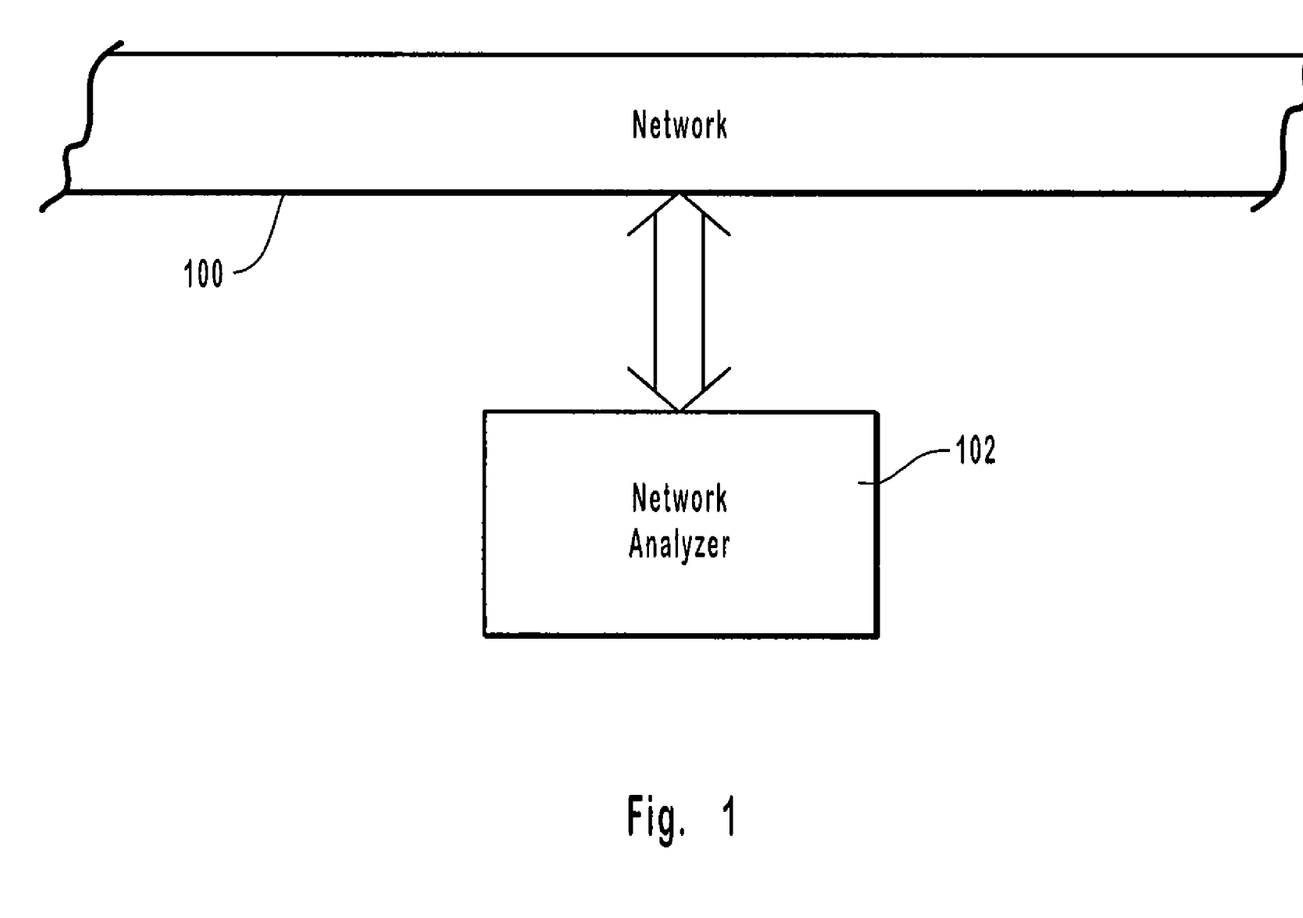
FIG. 1 is a schematic diagram that illustrates the relation of a protocol analyzer with respect to a computer network according to embodiments disclosed herein.

Reference is first made to FIG. 1, which shows a simplified view of a portion of a communications network, generally designated at 100. The communications network 100 may comprise, for illustrative purposes, a portion of a wide area network (WAN), a local area network (LAN), a storage area network (SAN), or other networks known in the art. The communications network 100 includes various components that communicate with one another via the network, including for example, computers, servers, and mass storage devices. Transmitted data exchanged between these components and others known in the art is referred to herein as communications traffic or network traffic. The communications traffic is transmitted via network components by processes well known in the art. The data contained in the communications traffic can comprise both physical protocols, which characterize the nature or formatting of the data, and logical protocols that include the content of the data itself.

As seen in FIG. 1, a network analyzer 102 is disposed in relation to the communications network 100 so as to be able to monitor communications traffic on the communications network 100. It is appreciated, however, that the network analyzer can be interconnected with the communications network 100 in any one of a variety of configurations, and thus is not limited to the particular configuration shown in FIG. 1. For example, the network analyzer may analyze communications traffic between any two nodes of the network, such as between a server and a computer terminal or a mass storage device. As explained herein, the network analyzer 102 may be employed to detect and debug erroneous or aberrant data communications that are included in the communications traffic. The network analyzer 102 may be configured to operate transparently to network 100. Alternatively, the network analyzer 102 can serve as part of a gateway to various devices in or portions of the network.

Figure 2:
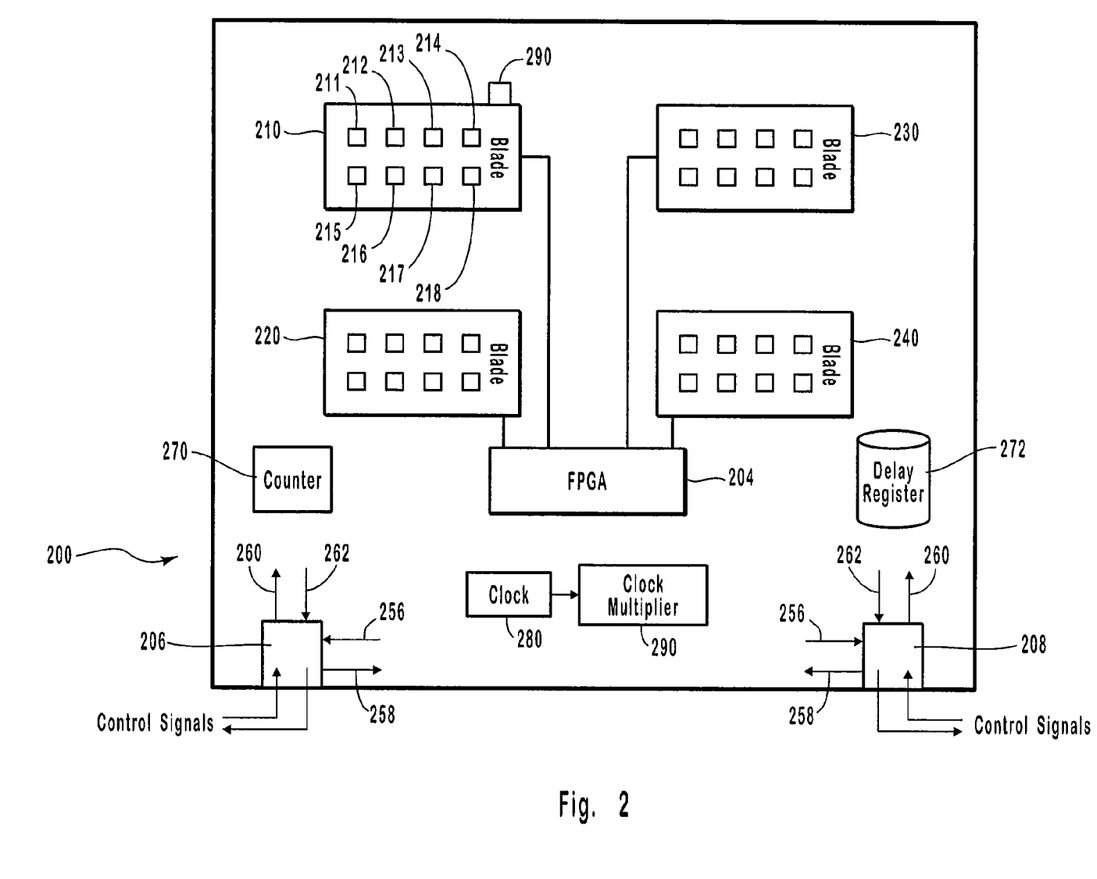
FIG. 2 is a diagram representing a chassis according to embodiments disclosed herein.

Referring now to FIG. 2, FIG. 2 is a block diagram that illustrates a protocol analyzer chassis 200. Generally, a chassis is the physical frame or structure of a computer system or other multi-component device. The protocol analyzer chassis 200 includes four blades, illustrated as blades 210, 220, 230, and 240. A blade is a thin, energy and cost-efficient electronic circuit board that is designed to be plugged or positioned in a chassis with other blades like a book in a library shelf. Such modular electronic circuit boards may contain one, two, or more microprocessors and memory and usually has an operating system and the application program to which it is dedicated. Alternatively, the modular electronic circuit boards may contain logic devices such as application-specific integrated circuits (ASICs) or field programmable gate arrays (FPGAs) that provide, or can be programmed to provide, a desired function, such as a protocol analyzer. According to embodiments of the invention, each blade may include one or more network analyzers thereon, examples of which are provided below.

The chassis 200 further includes, by way of example, a motherboard (not depicted) capable of running software and also capable of communicating with each of the blades. The motherboard has a connection to a network to allow communication with other systems on the network, such as other chassis, and also a client system which is used to configure and control each chassis. Each blade includes a connector 290 (illustrated on blade 210 only for simplicity) that allows blades 210, 220, 230, and 240 to connect to the motherboard. Connector 290 may be any reasonable connector configured to allow this connection. Connector 290 thus also enables blades 210, 220, 230, and 240 to be connected to a chassis that is part of a multi-chassis system.

Blade 210 includes ports 211, 212, 213, 214, 215, 216, 217, and 218. A port is generally a specific place on a networked device for being physically connected to some other device, usually with a socket and plug of some kind. It will be understood that when ports are referred to herein that additional software and/or hardware, such as analyzer modules and capture buffers, are in communication with the port to affect the desired network analysis and data capture. Thus, the ports 211, 212, 213, 214, 215, 216, 217, and 218 physically connect to the transmission medium of the network and can be used to assist other devices in monitoring network traffic and capturing data of interest. It is the need to have ports that can operate in conjunction with other ports that has led to the development of chassis, such as chassis 200 that support a certain number of blades which in turn support a certain number of ports. Protocol analyzer 200 thus has multiple ports, analyzers, and capture buffers that can be used to collectively capture and analyze data that is transmitted on different data links in a network, such as network 100, or in different channels in the network.

Each blade supports a plurality of ports, such as two, four, eight or any number of additional ports. The blade 210, for example, includes or supports the ports 211, 212, 213, 214, 215, 216, 217, and 218. The other blades 220, 230, and 240 of protocol analyzer chassis 200 similarly include or support a number of ports (as well as capture buffers and analyzer modules). The ports may be either unidirectional or bi-directional ports.

As previously mentioned, connected to each port 211, 212, 213, 214, 215, 216, 217, and 218, are capture buffers and analyzer modules. The protocol analyzer 200 is thereby configured to enable the capture of desired data contained in the traffic of a communications network. The capture of the data may be triggered by one of the analyzer modules detecting a selected datum or event in the communications traffic, such as one or more statistical characteristics of that data.

Ports and the associated analyzer module and capture buffers perform both filtering and triggering operations. In particular, the filter operation looks for a certain type of data that it wants to capture, such as certain types of packets. In some embodiments it may look for all packets, packets that contain a certain piece of information, a certain type of packet from a certain port to another port, an error, statistical information, or other network data of interest. The filter passes all types of traffic that are not currently of interest to the analyzer while storing in a capture buffer or capturing data that is of interest.

Triggering operations generally include stopping the capture of data so that a static collection of data in the capture buffers is maintained. A trigger may be generated if selected data of interest is identified, for example, or if a capture buffer that has data stored by filtering operations becomes filled. The trigger operation may direct each port in a trigger group to stop immediately or to capture data for a period of time and then stop so that the capture buffer contains network data from before and after the network data of interest was identified. The trigger command is generated at a single port and then communicated to each port in the trigger group via a serial protocol for coordinated action.

The protocol analyzer chassis 200 further includes, by way of example, a field programmable gate array (FPGA) 204 or other similar module. The FPGA 204 is an integrated circuit incorporating an array of programmable logic gates that are not pre-connected but where the connections are programmed electrically by the network administrator. The FPGA 204 can be used, for example, to direct various signals to various ports. The FPGA 204 is also used to program each port to a particular trigger group and to set the correct bits from the control signals to the appropriate port. The FPGA 204 can be programmed via another port from a processor, for example. The FPGA 204 can also coordinate the transitions between Discovery Mode and Normal Mode as well as coordinate the operation of each.

The protocol analyzer chassis 200 further includes inter-chassis communication devices, such as cable receptacles 206, 208, which are each adapted to receive a network cable, or "sync-cable," one in an upstream direction and one in a downstream direction. The cable receptacles 206, 208 may comprise, for example, RJ-45 jacks. Each cable carries control signals between adjacent chassis in a serial connection as described herein. Example control signals include, but are not limited to, a data in signal 260, a data out signal 262, a clock in signal 258, and a clock out signal 256. The data in signal 260 and data out signal 262 may further include various component signals, for example, a run signal, a stop signal, a trigger signal, and a chassis discovery signal. Although the data in signal 260 and data out signal 262 are communicated via chassis to chassis communication, the data signals are particular to specific trigger groups. In addition, it will be understood by those skilled in the art that the use of cable receptacles 206, 208 and accompanying cables can be replaced by wireless communications devices.

Each port can generate a trigger signal, which indicates that a trigger event or condition has occurred. After the trigger signal is generated, it is transmitted to each port in the trigger group across the connected chassis so that each port will respond as desired, typically capturing a specified range of communications for analysis, as previously mentioned.

Figure 3:
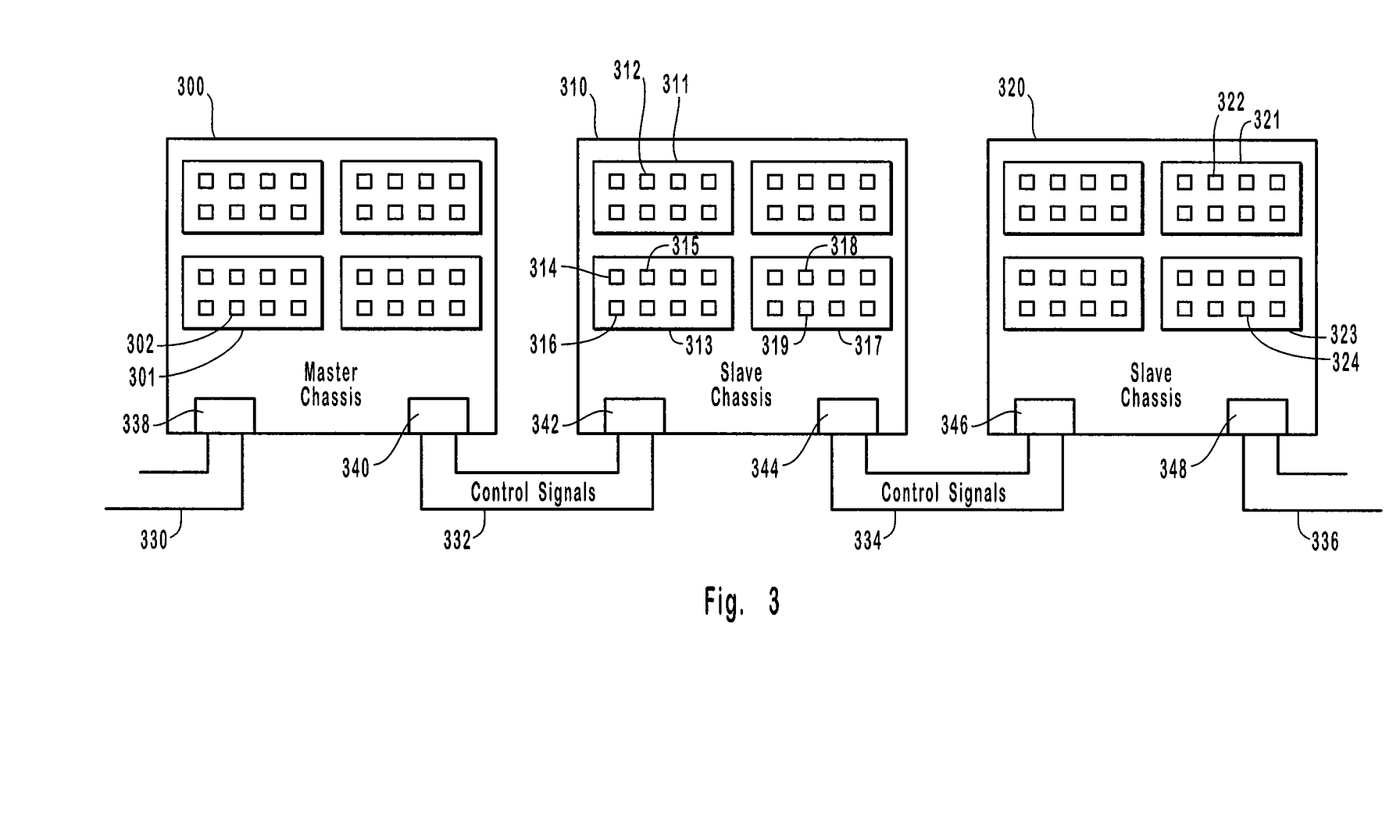
FIG. 3 is a diagram representing a multi-chassis system according to embodiments disclosed herein.

Protocol analyzer chassis 200 may include an oscillator or clock 280 that operates at a certain frequency (such as 50 MHz) to generate a clock signal that is propagated to the other protocol analyzer chassis in the chain. Because the ports can often support a high data rate, the clock signal of the clock 280 is multiplied by the clock multiplier 290 and the resulting clock signal of the clock multiplier is used to drive time stamp counters of each port of each blade within the chassis. Each time stamp counter of each port is thus driven by the multiplied clock signal generated by the clock multiplier 290. The clock signals are transmitted as a clock out signal 256 and a clock in signal 258. The clock out signal 256, for example, is typically generated by a master chassis and is sent to one or more slave chassis (as shown in FIG. 3). The clock in signal 258 may be used to run the counter 280. The clock in signal 258 may refer to the clock signal that is received from a previous master or slave chassis (shown in FIG. 3). The master chassis sends the clock to the first slave chassis, which in turn receives the clock and passes it on to the next slave chassis, if any, and so forth.

In various embodiments it may be preferable to have different clocks operating for chassis-to-chassis communication and for port-to-port communication. For example, the master chassis can generate a 50 MHz clock signal that will be used by all chassis for chassis-to-chassis communication. A 100 MHz timestamp clock may in turn be generated for the port-to-port communication.

Each chassis may be isolated or serially connected to other chassis via the sync-cables, which are one form of a chassis interconnection means. Accordingly, FIG. 3 is a block diagram that illustrates a series of chassis that are connected by sync-cables 330, 332, 334, 336 in a particular topology. In one example, the sync-cables may connect to each chassis using RJ-45 connectors which connect with RJ-45 jacks 338, 340, 342, 344, 346, 348 in each chassis. The sync-cables carry the control signals from one chassis to the next. For example, the chassis 300 is connected with the chassis 310 by the cable 332 and the chassis 310 is connected to the chassis 320 by the cable 334. Sync-cables 330 and 336 illustrate that the chassis chain may be extended in either direction. The chassis 300, 310 and 320 are not required to be co-located. Software can be used to detect any illegal connection, such as braches or loops in the chassis topology.

Referring again to FIG. 2, each chassis includes a delay register 272 that can be programmed with the transmission latency between the various chassis in a chain. The delay register itself may reside in the FPGA 204, or it may be implemented in hardware external to the FPGA. These latencies are predictable and can therefore be experimentally determined and stored in the delay register. The delay register 272 is then referred to each time an incoming or outgoing control signal indicates that a selected activity should be performed. The delay register informs the chassis how long it should delay before implementing the activity so that each chassis can synchronously perform the selected activity rather than at delays corresponding to transmission latencies. In some cases it may be desirable to delay only certain signals using the delay register, while other signals are acted upon immediately after being received.

Each group of connected chassis can be configured as one or more than one sync-group. During normal operation, the most upstream chassis in a sync-group is designated as a master and has nothing connected to its upstream incoming cable receptacle (unless there is an upstream sync-group). Downstream chassis in a sync-group are designated to be slaves.

If the chain is logically broken into multiple chains, or sync-groups, no communication takes place between the sync-groups. This is accomplished via a control register in each chassis that specifies whether incoming information is to be ignored from either the upstream or downstream chassis. The most upstream chassis (which should be a master, otherwise it cannot be used), should be configured to ignore any information from its upstream side. Likewise, the most downstream chassis in a sync-group should be configured to ignore any information from its downstream side. Each master chassis, whether it is the most upstream chassis or not, is configured to ignore any information from its upstream side. This guarantees that each sync-group is isolated from each other and that any chains that are in Normal Mode are not interfered with should additional chassis be added to the beginning or end of a chain.

As illustrated by example in FIGS. 2 and 3, an illustrative chassis can support up to four blades and each blade can support up to eight ports. As noted earlier, however, the individual chassis may support any number of blades that include any number of ports. A "trigger group" refers to a group of ports in a sync group that are bundled or logically connected together. The trigger groups generally include at least two ports as a connection of two ports is the smallest meaningful combination. Because the chassis or blades are not necessarily of the same technology, it is possible to have different types of ports within a single trigger group. In addition, a trigger group allows different ports in a sync group to be configured to all trigger on the same trigger condition and to otherwise work in tandem.

In many applications, it is often useful to generate an arm condition for a trigger group. In this description and in the claims, an "arm condition" is defined to mean a precondition for a triggering condition or event that typically should be encountered before triggering of the trigger group will occur. In other words, the arm condition defines data that should be encountered by at least one port in the trigger group before triggering will occur. If data constituting a trigger condition is received prior to the data constituting the arm condition, then triggering of the network analyzer will typically not occur.

Sometimes, however, it is desirable to remove an arm condition once it has been generated by generating a rollback condition. In this description and in the claims, a "rollback condition" is defined to mean a condition that removes an arm condition. In other words, the rollback condition removes the precondition for triggering defined by the arm condition. Once the arm condition has been removed, triggering will not occur if a trigger condition is encountered. A rollback may also be referred to as "de-arming." In some embodiments, a rollback may automatically occur if a trigger condition is not encountered in a predetermined amount of time.

Referring again to FIG. 3, a chassis 300 is illustrated as including a blade 301 with a port 302. Also illustrated is a chassis 310 that includes a blade 311, a blade 313, and a blade 317. Blade 311 includes port 312, blade 313 includes ports 314, 315, and 316, and blade 317 includes ports 318 and 319. Finally, a chassis 320 is illustrated as including a blade 321 and 323. Blade 321 includes port 322 and blade 323 includes port 324. As mentioned above, each of these blades may be considered a network analyzer blade and may include a connector (290 in FIG. 2) that allows the blade to be connected to the chassis 300, 310, or 320. Note that these ports are all configured in a single trigger group.

As mentioned previously, it is often desirable for an arm condition to be generated as a precondition for a triggering event or condition. For example, the arm condition may be generated at port 312 of blade 311. However, it is often the case that the multi-chassis network analyzer comprised of chassis 300, 310, and 320 is configured to monitor multiple network devices. Accordingly, data may be received on many of the ports of chassis 300, 310, and 320. It is quite possible that a triggering event will be encountered on a port other than port 312. If such an event were to occur, then the purpose of the arm condition, which is to act as a precondition for triggering, may be frustrated.

To prevent this, the principles of the present invention allow for the arm condition to be propagated or transmitted to at least some of the additional ports of multi-chassis system. For example, as previously described, an arm condition may be generated at port 312. This arm condition may then be transmitted to the other ports of chassis 310. For instance the arm condition may be transmitted to ports 314, 315, and 316 of blade 313 and to ports 318 and 319 of blade 317. In this way, the arm condition is transmitted to the other ports of chassis 310 that are in the same trigger group as port 312. By limiting the propagation of the arm condition to same chassis as port 312, bandwidth in the multi-chassis system is conserved for other important tasks.

In some embodiments, the arm condition may also be propagated or transmitted to at least some of the other chassis in the multi-chassis system. However, in order to conserve bandwidth in the multi-chassis system, the arm condition will typically not be transmitted to ports in at least one of the chassis in the multi-chassis system.

For instance, the arm condition generated at port 312 may also be transmitted across chassis to port 302 of chassis 300. However, the arm condition generated at port 312 is not transmitted to ports 322 and 324 of chassis 320. Alternatively, the arm condition generated at port 312 may be transmitted across chassis to ports 322 and 324 of chassis 320 while not being transmitted to port 302 of chassis 300. Of course, in some embodiments the arm condition will only be transmitted to the ports of chassis 310 and not to the ports of either chassis 300 and 320.

Accordingly, an arm condition generated at a first port of a first chassis or network analyzer blade may be transmitted to one or more additional ports of the first and potentially third chassis without transmitting the arm condition to the ports of a second chassis. Note that in this description and in the claims, use of the terms first, second, third and so on to designate an element is used to distinguish one element from another and is not used to imply sequential ordering or the like.

Detection of a triggering condition should then limited to those ports of the multi-chassis system that have received the arm condition. This ensures that the data constituting the triggering condition is detected by those ports that will recognize it based on their having received the arm condition. This in turn ensures that triggering of the trigger group will occur. Note that the triggering condition may be received by or encountered by ports that have not received the arm condition. However, such ports will not detect the trigger condition and therefore will not cause triggering of the trigger group or the network analyzer to occur.

In some embodiments, it may be desirable to generate a rollback condition to de-arm the arm condition. In such embodiments, the rollback may be generated by a port of the trigger group or a port of a network analyzer blade. The rollback may then be transmitted to those ports of the multi-chassis system that have received the arm condition as previously described.

For example, the rollback condition may be generated at port 312 and may then be transmitted to the other ports of chassis 310 that have received the arm condition and to any ports of chassis 300 or 320 that have received the arm condition. Note that the rollback may also be generated at a port other than port 312 and may then be transmitted to the other ports that have received the arm condition. In other words, in some embodiments the arm and the rollback may be generated at the same port and in other embodiments the arm and the rollback may be generated by different ports.

Figure 4:
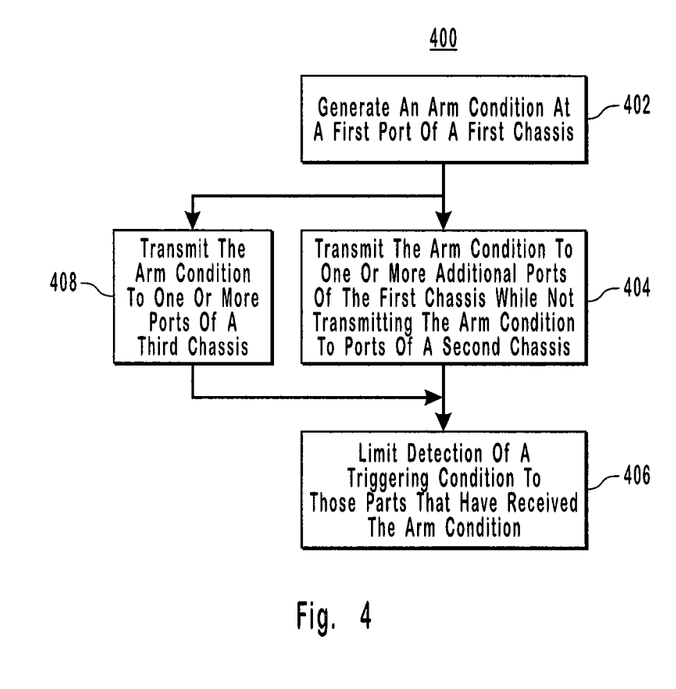
FIG. 4 illustrates a method for controlling the propagation of an arm condition across ports of a multi-chassis system.

Referring now to FIG. 4, a method 400 for controlling the propagation of an arm condition across ports of a multi-chassis system is illustrated. Method 400 will be described in relation to the environment described previously in relation to FIG. 3, although this not required. It will be appreciated that the method 400 may be practiced in any reasonable multi-chassis analyzer system. It will also be appreciated by one skilled in the art after having read this description that software may configure one or more microprocessors included in the various blades of the multi-chassis system or a microprocessor of the client system coupled to the various chassis to perform the acts of method 400.

Method 400 includes an act of generating an arm condition at a first port of a first chassis or network analyzer blade (act 402). For example, an arm condition may be generated at port 312 of blade 311 of chassis 310 as previously explained. As mentioned above, the arm condition defines a precondition for triggering of a trigger group or a network analyzer.

The method 400 also includes an act of transmitting the arm condition to one or more additional ports of the first chassis while not transmitting the arm condition to any ports of the second chassis (act 404). For example, the arm condition generated at port 312 may be transmitted to ports 314, 315, and 316 of blade 313 and to ports 318 and 319 of blade 317. As noted above, the arm condition is not transmitted to the ports of chassis 300 and 320.

Method 400 further includes an act of limiting detection of a triggering condition to those ports that have received the arm condition (act 406). For example, detection of a triggering condition should then limited to those ports of the multi-chassis system, such as ports 312, 314, 315, 316, 318, and 319, that have received the arm condition. This ensures that the data constituting the triggering condition is received by those ports that will recognize it based on their having received the arm condition.

In some embodiments, the multi-chassis system may include a third chassis. Accordingly, in such embodiments method 400 also includes an act transmitting the arm condition to one or more ports of a third chassis (act 408). In such embodiments, the arm condition generated at port 312 may be transmitted to the ports of the third chassis while still not transmitting the arm condition to the ports of the second chassis. For example, the arm condition generated at port 312 may also be transmitted across chassis to port 302 of chassis 300. However, the arm condition generated at port 312 is not transmitted to ports 322 and 324 of chassis 320. Alternatively, the arm condition generated at port 312 may be transmitted across chassis to ports 322 and 324 of chassis 320 while not being transmitted to port 302 of chassis 300.

Figure 5:
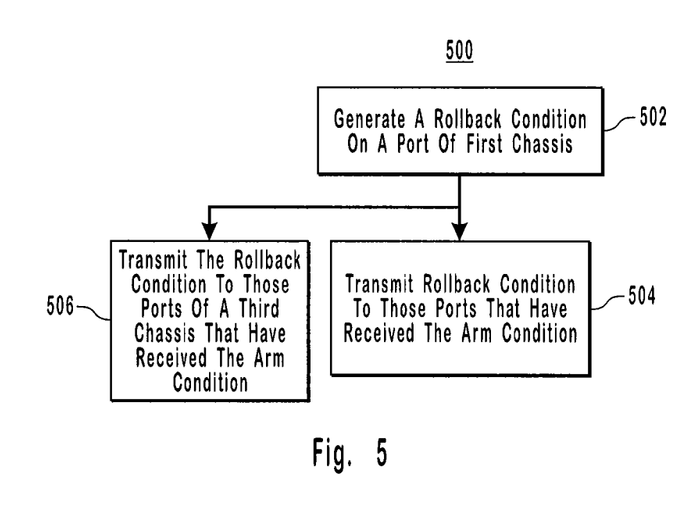
FIG. 5 illustrates a method for controlling the propagation of a rollback condition across ports of a multi-chassis system.

Referring now to FIG. 5, a method 500 for controlling the propagation of a rollback condition across ports of a multi-chassis system is illustrated. Method 500 will be described in relation to the environment described previously in relation to FIG. 3, although this not required. It will be appreciated that the method 500 may be practiced in any reasonable multi-chassis analyzer system. It will also be appreciated by one skilled in the art after having read this description that software may configure one or more microprocessors included in the various blades of the multi-chassis system or a microprocessor of the client system coupled to the various chassis to perform the acts of method 500.

Method 500 includes an act of generating a rollback condition on a port of a first chassis or network analyzer blade (act 502). For example, the rollback condition may be generated at port 312. Alternatively, the rollback condition may be generated at another port of the multi-chassis system.

Method 500 also includes an act of transmitting the rollback condition to those ports that have received the arm condition (act 504). For example, the rollback condition may be transmitted to those ports of chassis 310 that have received the arm condition as previously described and those ports of chassis 300 or 320 that have received the arm condition as previously described.

In some embodiments, the multi-chassis system may include a third chassis. Accordingly, in such embodiments method 500 also includes an act of transmitting the rollback condition to those ports of the third chassis that have received the arm condition (act 506). For example, if chassis 300 was the third chassis and if the ports of chassis 300 had received arm condition, then the rollback condition would be transmitted to the ports of chassis 300. Alternatively, if chassis 320 was the third chassis and if the ports of chassis 320 had received arm condition, then the rollback condition would be transmitted to the ports of chassis 320.

Related inventions in which the protocol analyzer chassis are operated in a "Discovery Mode" to discover and configure multiple ports over one or more chassis into respective domains and sync-groups are described in U.S. patent application Ser. No. 10/868,631 entitled "Discovery and Self-Organization of Topology in Multi-Chassis Systems," filed Jun. 14, 2004 and claiming the benefit of Provisional Application No. 60/479,735; both of which are incorporated herein by reference. Other related embodiments in which the configured sync-groups are operated in the "Normal Mode" by which a serial protocol is used to transmit run, stop, and trigger data between serially connected network protocol chassis to effect coordinated triggering to capture network data of interest are described in U.S. patent application Ser. No. 10/881,620 entitled "Propagation of Signals Between Devices for Triggering Capture of Network Data" filed Jun. 30, 2004 and claiming the benefit of Provisional Application No. 60/484,208; both of which are incorporated herein by reference. Further related embodiments in which the configured sync-groups are enabled to synchronize time-stamps and data capture across a multi-chassis system are described in U.S. patent application Ser. No. 10/882,711 entitled "Synchronization of Timestamps to Compensate for Communication Latency Between Devices" filed Jun. 30, 2004 and claiming the benefit of Provisional Application No. 60/483,993; both of which are incorporated herein by reference. Additional related embodiments in which the sync-groups are configured in multiple domains are described in U.S. patent application Ser. No. 11/462,669 entitled "Multiple Domains in a Multi-Chassis System" filed Aug. 4, 2006, which is incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network analyzer comprising:
a first chassis;
a second chassis; wherein the first and second chassis each include one or more blades and each blade includes one or more ports;
an interconnector coupled to the first and second chassis for interconnecting the first and second chassis such that at least some of the ports of the first and second chassis are configured to form a trigger group; and
a microprocessor accessible by the first and second chassis, wherein the network analyzer is configured such that executing software with the microprocessor configures the trigger group to perform the following:
   an act of generating an arm condition at a first port of the first chassis that is part of the trigger group;
   an act of transmitting the arm condition to one or more additional ports of the first chassis that are part of the trigger group while not transmitting the arm condition to the ports of the second chassis that are part of the trigger group such that not all ports of the trigger group receive the arm condition;
   an act of limiting detection of a triggering condition to those ports that have received the arm condition;
   an act of generating a rollback condition on a second port of the first chassis that is part of the triggergroup; and
   an act of transmitting the rollback condition to one or more of those ports that have received the arm condition while not transmitting the rollback condition to the remaining ports that have received the arm condition such that not all ports that received the arm condition receive the rollback condition, wherein those ports that receive the rollback condition are no longer configured to detect the triggering condition defined by the arm condition.

2. The network analyzer in accordance with claim 1, wherein the first and second ports of the first chassis are the same port.

3. The network analyzer in accordance with claim 1, wherein the network analyzer also includes a third chassis that includes one or more blades that each include one or more ports and wherein the third chassis includes an interconnector for connecting the third chassis with the first or second chassis such that at least some ports of the third chassis are included in the trigger group, wherein executing software with the microprocessor further configures the trigger group to further perform the following:
an act transmitting the arm condition to one or more ports of the third chassis that are part of the trigger group.

4. The network analyzer in accordance with claim 3, wherein executing software with the microprocessor further configures the trigger group to further perform the following:
an act of generating a rollback condition on a second port of the first chassis that is part of the trigger group; and
an act of transmitting the rollback condition to those ports of the third chassis that have received the arm condition.

5. The network analyzer in accordance with claim 4, wherein the first and second ports of the first chassis are the same port.

6. The network analyzer in accordance with claim 1, wherein the network analyzer also includes a third chassis that includes one or more blades that each include one or more ports and wherein the third chassis includes an interconnector for connecting the third chassis with the first or second chassis such that at least some ports of the third chassis are included in the trigger group, wherein executing software with the microprocessor further configures the trigger group to further perform the following:
an act of not transmitting the arm condition to one or more ports of the third chassis that are part of the trigger group when transmitting the arm condition to the one or more additional ports of the first chassis that are part of the trigger group.

7. The network analyzer in accordance with claim 1, wherein bandwidth in the multi-chassis system is conserved by not transmitting the arm condition to the ports of the second chassis that are part of the trigger group.

8. A network analyzer blade comprising:
one or more ports;
a connector configured to allow the analyzer blade to be connected to a first chassis of a multi-chassis system, wherein the first chassis includes at least a second network analyzer blade with one or more ports and wherein the multi-chassis system includes at least a second chassis that includes at least a third network analyzer blade with one or more ports, wherein at least some of the ports of the network analyzer blade, the second network analyzer blade and the third network analyzer blades are configured to form a trigger group;
access to a microprocessor configured to execute software, wherein executing the software with the microprocessor configures the network analyzer blade to perform the following:
an act of generating an arm condition at a first port of the network analyzer blade that is part of the trigger group;
an act of transmitting the arm condition to one or more additional ports of the first chassis that are part of the trigger group while not transmitting the arm condition to any ports of the third network analyzer blade of the second chassis that are part of the trigger group such that not all ports of the trigger group receive the arm condition;
an act of limiting detection of a triggering condition to those ports that have received the arm condition;
an act of generating a rollback condition on a second port of the network analyzer blade that is part of the trigger group; and
an act of transmitting the rollback condition to one or more of those ports that have received the arm condition while not transmitting the rollback condition to the remaining ports that have received the arm condition such that not all ports that received the arm condition receive the rollback condition, wherein those ports that receive the rollback condition are no longer configured to detect the triggering condition defined by the arm condition.

9. The network analyzer blade in accordance with claim 8, wherein the first and second ports of the network analyzer blade are the same port.

10. The network analyzer blade in accordance with claim 8, wherein bandwidth in the multi-chassis system is conserved by not transmitting the arm condition to the ports of the second chassis that are part of the trigger group.

11. A computer program product for use in a computing environment including a network analyzer including two or more chassis in a multi-chassis system, wherein each chassis includes one or more blades and each blade includes one or more ports, the computer program product for implementing a method controlling the propagation an arm condition or a rollback condition across ports of the multi-chassis system, the computer program product comprising one or more recordable or physical computer-readable media having thereon computer-executable instructions that, when executed by one or more processors of the computing environment, cause the computing environment to perform the method, the method comprising:
an act of generating an arm condition at a first port of a first chassis that is part of a trigger group including two or more chassis;
an act of transmitting the arm condition to one or more additional ports of the first chassis that are part of the trigger group while not transmitting the arm condition to ports of a second chassis that are part of the trigger group such that not all ports of the trigger group receive the arm condition;
an act of limiting detection of a triggering condition to those ports that have received the arm condition;
an act of generating a rollback condition on a second port of the first chassis that is part of the trigger group; and
an act of transmitting the rollback condition to one or more of those ports that have received the arm condition while not transmitting the rollback condition to the remaining ports that have received the arm condition such that not all ports that received the arm condition receive the rollback condition, wherein those ports that receive the rollback condition are no longer configured to detect the triggering condition defined b the arm condition.

12. The computer program product in accordance with claim 11, wherein the first and second ports of the first chassis are the same port.

13. The computer program product in accordance with claim 11, wherein the network analyzer also includes a third chassis that includes one or more blades that each include one or more ports and wherein the third chassis includes an interconnector for connecting the third chassis with the first or second chassis such that at least some ports of the third chassis are included in the trigger group, wherein the computer-readable media has thereon computer-executable instructions that, when executed by the one or more processors, further cause the computing system to perform the following:

an act transmitting the arm condition to one or more ports of the third chassis that are part of the trigger group.

14. The computer program product in accordance with claim 13, wherein the computer-readable media has thereon computer-executable instructions that, when executed by the one or more processors, further cause the computing system to perform the following:

an act of generating a rollback condition on a second port of the first chassis that is part of the trigger group; and an act of transmitting the rollback condition to those ports of the third chassis that have received the arm condition.

15. The computer program product in accordance with claim 14, wherein the first and second ports of the first chassis are the same port.

16. The computer program product in accordance with claim 11, wherein the network analyzer also includes a third chassis that includes one or more blades that each include one or more ports and wherein the third chassis includes an interconnector for connecting the third chassis with the first or second chassis such that at least some ports of the third chassis are included in the trigger group, wherein the computer-readable media has thereon computer-executable instructions that, when executed by the one or more processors, further cause the computing system to perform the following:

an act of not transmitting the arm condition to one or more ports of the third chassis that are part of the trigger group when transmitting the arm condition to the one or more additional ports of the first chassis that are part of the trigger group.

17. The computer program product in accordance with claim 11, wherein bandwidth in the multi-chassis system is conserved by not transmitting the arm condition to the ports of the second chassis that are part of the trigger group.

* * * * *